CIRCUIT ARRANGEMENT FOR INCREASING THE EFFICIENCY
OF AN ELECTRON TUBE TYPE AMPLIFIER

Filed Sept. 6, 1963 3 Sheets-Sheet 1

INVENTOR
ERICH HEINECKE
BY [signature]
ATTORNEY

INVENTOR
ERICH HEINECKE

BY

ATTORNEY

June 28, 1966 E. HEINECKE 3,258,710

CIRCUIT ARRANGEMENT FOR INCREASING THE EFFICIENCY
OF AN ELECTRON TUBE TYPE AMPLIFIER

Filed Sept. 6, 1963 3 Sheets-Sheet 3

INVENTOR
ERICH HEINECKE
BY
ATTORNEY 3,258,710

CIRCUIT ARRANGEMENT FOR INCREASING THE EFFICIENCY OF AN ELECTRON TUBE TYPE AMPLIFIER

Erich Heinecke, Berlin, Germany, assignor to International Standard Electric Corporation, New York, N.Y., a corporation of Delaware Filed Sept. 6, 1963, Ser. No. 307,210
Claims priority, application Germany, Sept. 20, 1962, St 19,736; Sept. 27, 1962, St 19,766
11 Claims. (Cl. 330—123)

The present invention relates to a circuit arrangement for increasing the efficiency of an electron tube type amplifier for a modulated carrier frequency voltage.

The efficiency of a tube type amplifier is dependent upon the anode or plate voltage utilization, and the current utilization factor. In addition, the operating point determines the linearity as well as the efficiency, particularly for class B-amplifiers. A normal amplifier of this type has a current factor of 1.57 and a voltage factor of about 0.9, which limits the efficiency to $$\frac{1.57\times0.9}{2}$$

or 0.705.

It is therefore an object of the present invention to provide an amlifier of improved efficiency. The novelty resides in the fact that the anode or plate operating voltage is composed of a direct voltage and a superimposed auxiliary A.C. voltage having a frequency of double the value of the frequency of the carrier voltage. The amplitude of the auxiliary A.C. voltage remains unchanged, and is thus independent of the modulation, and is chosen so that in the event of maximum modulation of the tube by the signal, and at a peak anode current, there will remain a predetermined anode voltage, and that at the desired conduction period, where the anode current just becomes zero, this remaining anode voltage is very small. In the case of tetrodes it is of advantage to employ the same measure at the screen grid, so that in the same period there will only be available either a small or no screen-grid voltage at all.

One particular advantage of the circuit arrangement which is especially effective for tetrodes, is the deformation of the anode-current characteristic with respect to the control voltage of the tube. Accordingly, there will result a reduction or diminution of the operating angle or conduction period of the anode current with respect to the input or control voltage and, consequently, an improvement of the current factor of the basic wave amplitude with respect to direct current. In this case the negative control grid bias will have to be adjusted in such a way that in the case of a low anode residual current the output characteristic which is dependent upon the control grid, will have a linear response. This adjustment will approximately result in an operating angle of 60°, hence class C-operation, as well as in a current factor of 1.76.

The invention is also applicable to push-pull amplifiers wherein the maximum efficiency of a normal class B amplifier operating linearly and without distortion, is predetermined and amounts to about 65%. The added A.C. voltage of twice the frequency is supplied by an additional class B amplifier whose input is fed with a voltage derived from the full-wave rectification of the input signal of the push-pull amplifier. The details of the invention and other objects and advantages will be explained more fully by reference to the following examples and drawings, in which.

Figure 1:
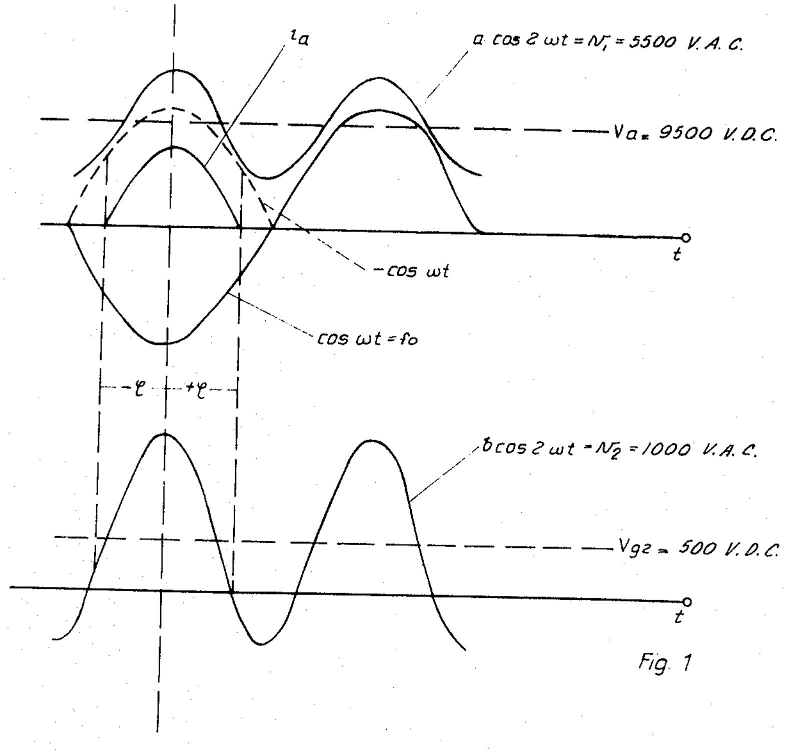
FIG. 1 shows the current and voltage waveforms of the novel amplifier circuit.
Figure 2:
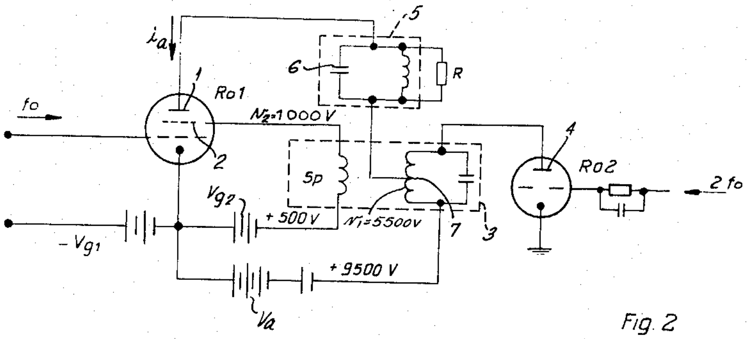
FIG. 2 shows a basic circuit diagram.

As shown in FIGS. 1 and 2 for example, at a transmitted high-frequency output of 200 kw., with a direct voltage source, $V_a$, of 9500 v., the anode load is approximately 160 kw. and the double frequency alternating voltage, $v_1$, of 5500 v. produces approximately 60.4 kw., which corresponds to an anode input of approximately 220.0 kw. and to an anode efficiency of approximately 91%. The screen grid 2 is coupled to a 500 v. D.C. supply, $V_{g2}$, with an added 1000 v., A.C., $v_2$, of twice the signal frequency. In this case the tube would normally be operated with a plate voltage of 15,000 volts and screen grid voltage of 1500 volts, with a normal efficiency of 70.5% at the anode 1. Relative thereto it is to be considered that in this particular example, the tube, at its peak or maximum amplitude value, still has the required high remaining potential of 1500 volts.

When considering that the additional doubled frequency anode A.C. voltage $v_1$ is produced with the aid of a separate tube $Ro_2$ operated at voltage saturation, with a total network efficiency of about 75%, then the input of 60 kw. is increased to $$\frac{60}{0.75}$$

or 80 kw.; hence to a total of 160+80=240 kw., and the overall efficiency will become 83.5%. This is a very high efficiency for a tetrode operated as a linear amplifier. FIG. 1 shows typical current and voltage conditions at the correspondingly identified points shown in FIGURE 2. The signals are shown only by way of example and many other variations are also possible.

FIG. 2 shows a basic circuit diagram of the invention. A source of anode D.C. voltage $V_a$ supplies a voltage of 9500 volts to operate the output tube $Ro_1$ as well as the auxiliary tube $Ro_2$. The tube $Ro_2$ is fed from a source of double the carrier frequency, 2 *fo*, and produces, in an overvoltage or limiting condition, the additional anode A.C. voltage $v_1$ of 5500 volts. This is taken from a tap 7 on a tuned circuit 3 which is coupled to the output electrode 4 of tube $Ro_2$. In view of the overvoltage operation, and the fact of being operated from the same source of voltage, with about 2500 volts at the plate 4 of $Ro_2$, the alternating voltage as well as its relationship to the direct voltage will remain constant even under load variations. The supply of the screen grid 2 of the tube $Ro_1$ with an alternating voltage $v_2$ of 1000 volts is accomplished by means of a coil SP which is coupled to the tuned circuit 3.

The effective load resistance R is coupled to the anode output circuit 5 of the operational tube $Ro_1$, which circuit is tuned to the operating frequency. Care should be taken that the auxiliary voltage $v_1$ of twice the frequency is applied with the proper phase to the anode 1 of the output tube $Ro_1$, and that it is bypassed around the load resistance R via capacitor 6 in tuned circuit 5, and that the signal frequency A.C. voltage of the tube $Ro_1$ is also applied to the anode 4 of the auxiliary tube $Ro_2$, to maintain the desired efficiency.

Figure 3:
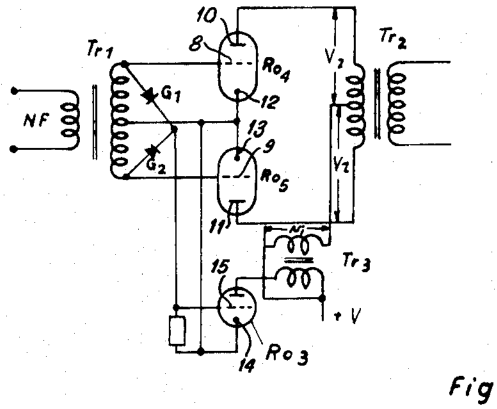
FIG. 3 shows an example of a quiescent push-pull amplifier and the additional amplifier.

FIG. 3 shows an input transformer $TR_1$ which, on the secondary side, supplies the grids 8 and 9, respectively, of two tubes $Ro_4$ and $Ro_5$ connected in a push-pull arrangement. The anodes 10 and 11, respectively, of these tubes are applied in the conventional manner to the ends of the primary winding of an output transformer $TR_2$. The center of the secondary winding of transformer $TR_1$ is applied to the cathodes 12 and 13, respectively, of the tubes $Ro_4$ and $Ro_5$, as well as to the cathode 14 of tube $Ro_3$. The center of the primary winding of the output transformer $TR_2$ is coupled to the source of D.C. operating voltage, $+V$.

The additional amplifier consists of the tube $Ro_3$ whose grid 15 is applied to the connecting point of the outputs of two rectifiers $G_1$ and $G_2$, with the inputs thereof being connected to the grids 8 and 9, respectively, of the tubes $Ro_4$ and $Ro_5$. The anodes 10 and 11 of the two tubes are connected through the secondary winding of a phase-reversing transformer $TR_3$ to the operating D.C. voltage $+V$. The sum of both the anode D.C. voltage $+V$ and the A.C. output voltage $v_1$ of the additional amplifier $Ro_3$, as combined in transformer $TR_3$, is applied to the center of the primary winding of transformer $TR_2$.

The alternating and direct voltages $v_1$ and $V_1$, respectively, are chosen so that the sum results in only positive values, and that the zero reference level is reached at the maximum amplifier output. The curve of the anode supply voltage for the tubes $Ro_4$ and $Ro_5$, during the respective anode-current flows, will correspond to a rectified sinewave of twice the input frequency whose magnitude is chosen so that, upon subtraction of the effective anode-A.C. voltage, at every point there will still remain a minimum positive potential at the anode of the tube.

When considering the mode of operation of the push-pull class B tubes, the following voltage will be applied to the anode during a half period:

$$V_{a(dc)}+v_1-V_2 \cos x=A_1 \cos x$$
$$-V_2 \cos x=(A_1-V_2) \cos x$$

When designating $V_2=Pv.A_1$ ($p_v$=voltage-utilization factor), then $V_a=A_1(1-p_v) \cos x$.

Upon the inset of the alternating current $I=A_2 \cos x$, the power loss $$N_v=A_1(1-p_v)A_2 \cdot ½$$

Since $N_v$ only appears during a half-period there will result the following:

$$N_{vRo_4}=\frac{1}{4}A_1A_2(1-p_v)$$

The useful output N will result as follows:

$$N_{Ro_4}=\frac{1}{4}A_1A_2p_v$$

and the efficiency $$\eta=\frac{N}{N+N_v}=p_v$$

Of course, the total efficiency of the tubes $Ro_4$ and $Ro_5$ is likewise $\eta=p_v$.

As calculated from $$A_2 \cdot \frac{1}{\pi} \cdot V_{a(dc)} \text{ and } V_{a(dc)}=A_1 \cdot \frac{2}{\pi}$$

there will result the direct-current output as received by the tube:

$$N_{a(dc)}=A_1A_2 \cdot \frac{2}{\pi^2}=0.203A_1A_2$$

The total power input $N_a$ of the tube may be computed as follows:

$$N_a=N_{a(dc)}+N_{v1}$$

$$N_{av_1}=N_a-N_{a(dc)}=N+N_v-N_{a(dc)}=\frac{1}{4}A_1A_2P_v+\frac{1}{4}A_1A_2(1-p_v)-\frac{2}{\pi^2}A_1A_2$$

$$N_{av_1}=A_1A_2\left(\frac{1}{4}-\frac{2}{\pi^2}\right)=0.047A_1A_2$$

From the power output $$N=\frac{1}{4}p_vA_1A_2$$

there may be calculated $$A_1A_2=\frac{4N}{p_v}$$

in other words, the useful output N is produced with a direct-current input $$N_{a(dc)}=\frac{1.203.4N}{p_v}=\frac{0.812}{p_v} \cdot N$$

and correspondingly also the power input which results from $v_1$.

$$N_{av_1}=\frac{0.047.4N}{p_v}=\frac{0.188}{p_v} \cdot N$$

and the power loss of the tube $$N_{vRo_{4,5}}=N\frac{1-p_v}{p_v}=N\left(\frac{1}{p_v}-1\right)$$

For computing the total efficiency of the circuit arrangement according to the invention it is necessary to consider the losses resulting when producing the additional voltage $v_1$.

The additional tube operates with an anode current which corresponds to a full-wave rectification:

$$N_{Ro_3}=\frac{V_2 \cdot A_2}{2}=\frac{p_vV_{a(dc)} \cdot A_2}{2}$$

$$N_a=V_{a(dc)} \cdot A_2 \cdot \frac{2}{\pi}$$

$$\eta=\frac{p_v \cdot V_{a(dc)} \cdot A_2 \cdot \pi}{2 \cdot 2 \cdot A_2 \cdot V_{a(dc)}}=p_v \cdot \frac{\pi}{4}=0.785 \cdot p_v$$

When placing $p_v$ of the main amplifier equal to $p_v$ of the additional amplifier, then the total efficiency will be obtained from $$\epsilon N_a=N_{aRo_4}+N_{aRo_5}+N_{aRo_3}=N\frac{0.812}{p_v}+N\frac{0.188}{p_v} \cdot \frac{1}{\eta Ro_3}=$$
$$N\left[\frac{0.812}{p_v}+\frac{0.188}{p_v.0.785p_v}\right]=\frac{N}{p_v}\left[0.812+\frac{0.2395}{p_v}\right]$$

$$\eta=\frac{N}{\epsilon N_a}=p_v\frac{1}{0.812+\frac{0.2395}{p_v}}=\frac{p_v^2}{0.812p_v+0.2395}$$

This results in the following tabulation:

| Circuit Employing Additional Amplifier | | | Normal Push-Pull Amplifier |
|---|---|---|---|
| $p_v$=1 | $\eta$=0.95 | $N_{vRo_{4,5}}$=N·0 | $\eta$=0.785 |
| =0.95 | $\eta$=0.895 | = ·0.05 | $\eta$=0.747 |
| =0.9 | $\eta$=0.834 | = ·0.11 | $\eta$=0.706 |
| =0.85 | $\eta$=0.778 | = ·0.175 | $\eta$=0.667 |
| =0.8 | $\eta$=0.72 | = ·0.25 | $\eta$=0.628 |

From the above table it may be seen that a considerable improvement of efficiency can be achieved when employing the circuit arrangement according to the invention. Another advantage of this circuit arrangement resides in the fact that operation of the class B amplifier tubes with both direct and alternating voltages achieves a higher peak operating voltage than for pure direct-voltage operation, and due to the high efficiency, it is possible to attain a higher output power.

Figure 4:
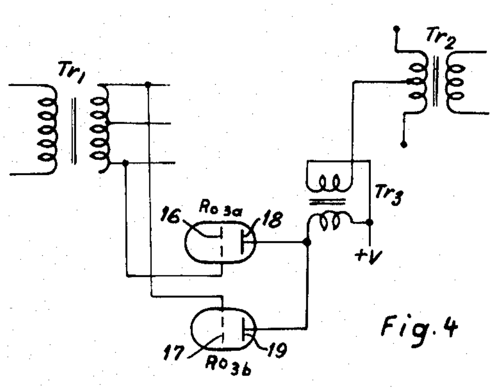
FIG. 4 shows a modification of part of the circuit arrangement according to FIG. 3.

The full-wave rectifier arrangement comprising diodes G1 and G2 as shown in FIG. 3 may be replaced by an additional amplifier having two tubes, $Ro_{3a}$ and $Ro_{3b}$ (FIGURE 4) whose grids 16 and 17 are each respectively connected to one grid 8 and 9 of the tubes $Ro_4$ and $Ro_5$. The anodes 18 and 19 thereof are connected together and are applied in common to the primary winding of the phase-reversing transformer $TR_3$. Such a circuit arrangement as shown in FIG. 4 which includes tubes $Ro_{3a}$ and $Ro_{3b}$ is a direct replacement for the combination comprising diodes G1 and G2 and tube $Ro_3$ of FIG. 3.

Figure 5:
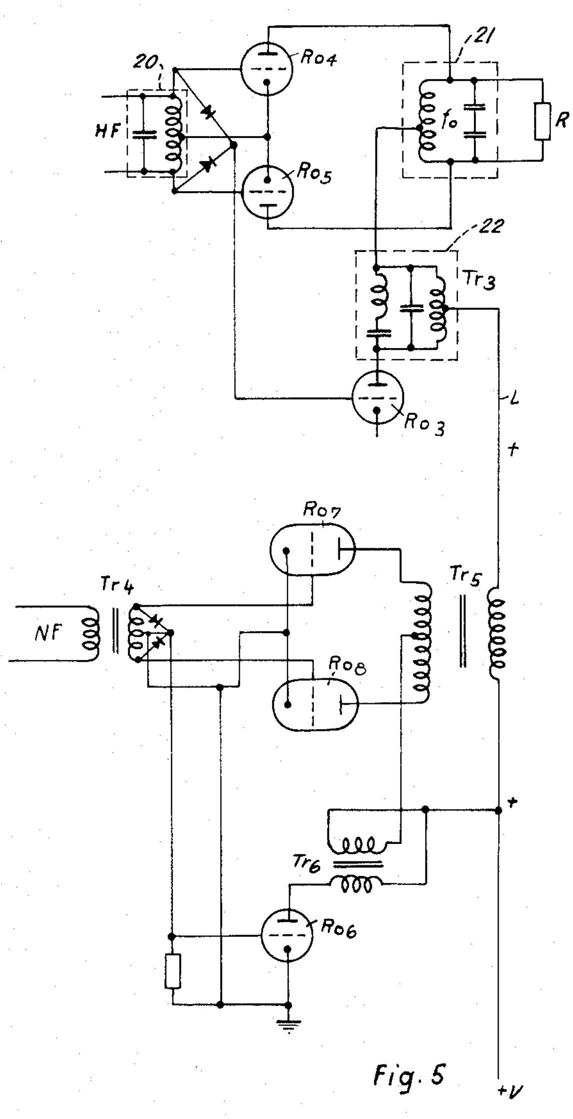
FIG. 5 shows a circuit arrangement in which the invention is applied to a high-frequency resonance amplifier.

FIG. 5 shows the employment of the inventive circuit arrangement in connection with a high-frequency resonance amplifier which is designed as a quiescent push-pull amplifier. The circuit arrangement of the amplifier comprising the tubes $Ro_4$ and $Ro_5$ resembles that of FIG. 3, but at both the input and the output of the amplifier there are circuits 20 and 21, respectively, which are tuned to the operating frequency, and at the output of the additional amplifier $Ro_3$ there are further oscillatory or tuned circuits or a network 22 for use with an additional amplifier having double the operating frequency, through which the A.C.-voltage components are transmitted. The center of the high-frequency transformer $TR_3$ of the additional amplifier is connected to the source of operating D.C. voltage +V. In the line L extending to this source of voltage there may now be arranged the secondary winding of a further output transformer $TR_5$ which is supplied by a low-frequency amplifier $Ro_7$, $Ro_8$ of a type similar to that shown in FIG. 3, for supplying the modulation signals. This push-pull amplifier comprising tubes $Ro_7$ and $Ro_8$ likewise comprises an additional amplifier $Ro_6$. In the case of high-frequency quiescent push-pull amplifiers it is possible that by use of the additional amplifier and the full-wave rectification, only the most significant A.C. voltage components with the desired amplitude values are transmitted. It is also important to take care that the anode-operating voltage curve will have no effect upon the anode-current curve. In the example, therefore, the anode network 22 of the additional amplifier has been provided with resonant response points tuned for the second and the fourth harmonic of the carrier frequency $f_o$.

The novel mode of dynamic operation thus permits achievement of higher peak-anode voltage than would be possible in the case of pure D.C. voltage operation, and results in a higher amplifier output. The illustrated embodiments are not to be construed as limiting the invention to the exact forms or uses shown and many other variations may be made in the design and configuration without departing from the scope of the invention as set forth in the appended claims.

I claim:

1. An electron tube amplifier circuit comprising:
first amplifier means;
means applying an input signal of a first frequency to said first amplifier;
second amplifier means;
means supplying a signal of twice said first frequency to said second amplifier;
means supplying direct operating potential to the output elements of said first and second amplifier;
means for combining an output signal from said second amplifier of twice said frequency with said direct potential supplied to said first amplifier output element; and
load means connected to said first amplifier output element.

2. The device of claim 1 wherein said first amplifier means comprises a first electron tube having a first input electrode and second and third electrodes, said input signal being applied to said first input electrode, and means applying said direct potential combined with a portion of said second amplifier output signal to said second electrode.

3. The device of claim 1 wherein said signal of twice said first frequency and said direct potential are dimensioned such that said second amplifier is operated in a saturated condition.

4. The device of claim 3 including means for tuning said load to present a relatively high impedance to said first frequency and a relatively low impedance to twice said first frequency, thereby transferring energy to said load at substantially only said first frequency.

5. The device of claim 4 wherein said direct operating potential and said second amplifier output are dimensioned such that said first amplifier conducts during only one half the cycle of said first frequency.

6. The device of claim 5 wherein said first amplifier comprises a push-pull amplifier, and wherein said direct operating potential and said second amplifier output are dimensioned such that each half thereof conducts during one half of said cycle.

7. The device of claim 6 including transformer means coupled to said direct potential, and to said first and second amplifier outputs for combining said output signal from said second amplifier with said direct potential for said first amplifier.

8. The device of claim 7 including a full wave rectifier coupling said first signal means to the input of said second amplifier for supplying said signal of twice said frequency.

9. The device of claim 7 wherein said second amplifier comprises a push-pull amplifier connected to said first signal means to supply said signal of twice said frequency, and having the anodes connected together to said transformer means.

10. The device of claim 7 wherein said direct operating potential and said second amplifier output are dimensioned such that said second amplifier conducts during only one half the cycle of said first frequency.

11. The device of claim 7 including circuit means for tuning the input and output signals of said push-pull amplifier to the first frequency and for tuning the output of said second amplifier to twice said first frequency.

References Cited by the Examiner

UNITED STATES PATENTS

| | | | |
|---|---|---|---|
| 2,215,672 | 9/1940 | Terman | 330—128 X |
| 2,469,598 | 5/1949 | Harris | 330—123 |

ROY LAKE, *Primary Examiner.*

R. P. KANANEN, *Assistant Examiner.*